March 8, 1960 P. G. PRITZ 2,927,523
ELECTRIC TOASTERS
Filed Oct. 9, 1957 3 Sheets-Sheet 1

INVENTOR,
Peter G. Pritz,
BY
J. Stuart Freeman
Attorney.

March 8, 1960

P. G. PRITZ 2,927,523

ELECTRIC TOASTERS

Filed Oct. 9, 1957

3 Sheets-Sheet 2

INVENTOR.
Peter G. Pritz,
BY
J. Stuart Freeman
Attorney.

March 8, 1960
P. G. PRITZ
2,927,523
ELECTRIC TOASTERS
Filed Oct. 9, 1957
3 Sheets-Sheet 3
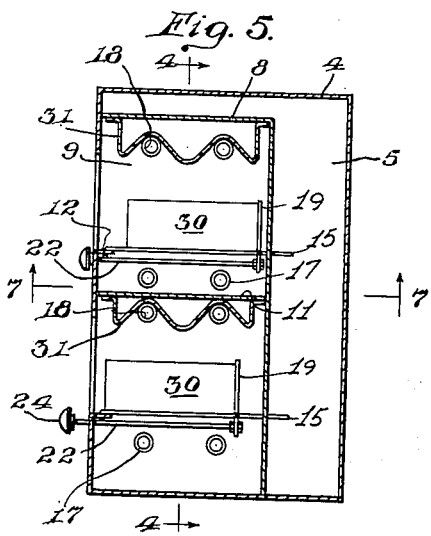
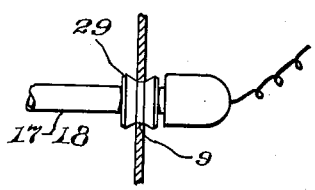
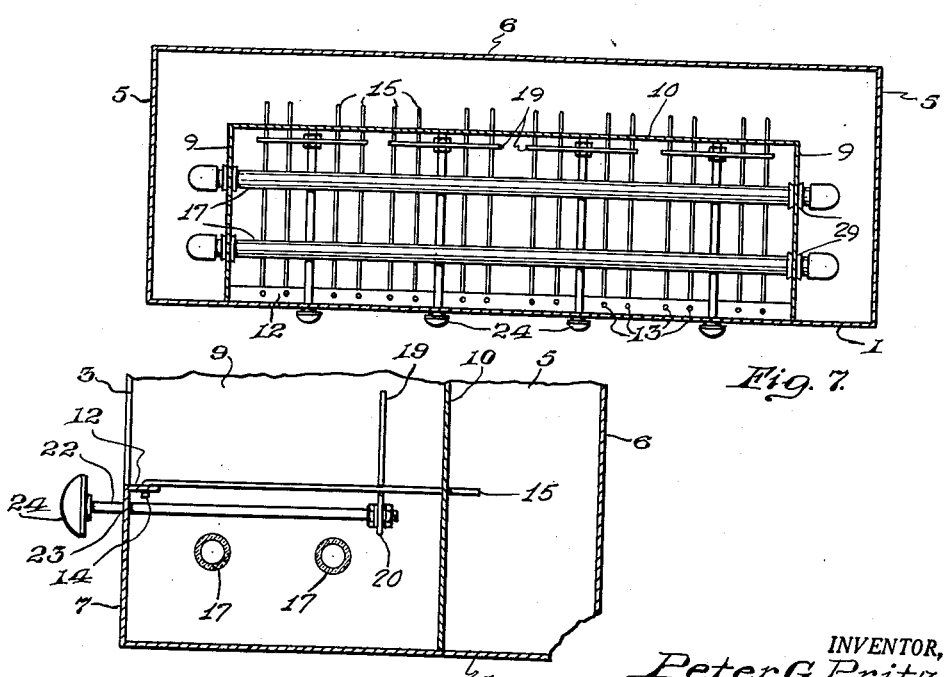
INVENTOR,
Peter G. Pritz,
BY
J. Stuart Freeman,
Attorney.

United States Patent Office 2,927,523
Patented Mar. 8, 1960

2,927,523

ELECTRIC TOASTERS

Peter G. Pritz, Jenkintown, Pa.

Application October 9, 1957, Serial No. 689,242

6 Claims. (Cl. 99—332)

The object of the invention is to provide improvements in electric toasters, and especially in that type which is automatic as to a pre-set period for operation, and the use of infra-red heat rays to toast substances, such as but not limited to, edible sandwiches and the like while encased in certain protective media.

As a result of recent and constantly accelerating trends towards speeding the treatment and dispensing of toasted and similarly prepared food products, catering to the preferences of patrons or consumers as to the degree of cooking or toasting preferred, constant maintenance of the desired degree of moisture content during refrigeration or other treatment while awaiting such cooking or the like, and uninterrupted maintenance of complete sanitation from initial preparation to ultimate consumption by plastic or other suitable protective media, another object is to embody all such factors in an overall result, that includes an improved cooking device that will be hereinafter referred to generically as a toaster.

A further object is to provide in such a toaster variable means for pre-setting the toasting period, and also if desired a pre-setting of the effective heat available, while within the scope of a given such pre-setting means provision is made of means for individually inserting or otherwise operatively positioning pre-packaged articles of food or the like, and similarly removing such individual units independently of one another.

Still another object is to provide a device of this nature, such as will occupy minimum space upon a counter or other desired supporting surface, and which is so constructed as to be readily cleaned at the end of a given period, as well as being repairable when necessary and/or having its parts replaced.

Figure 1:
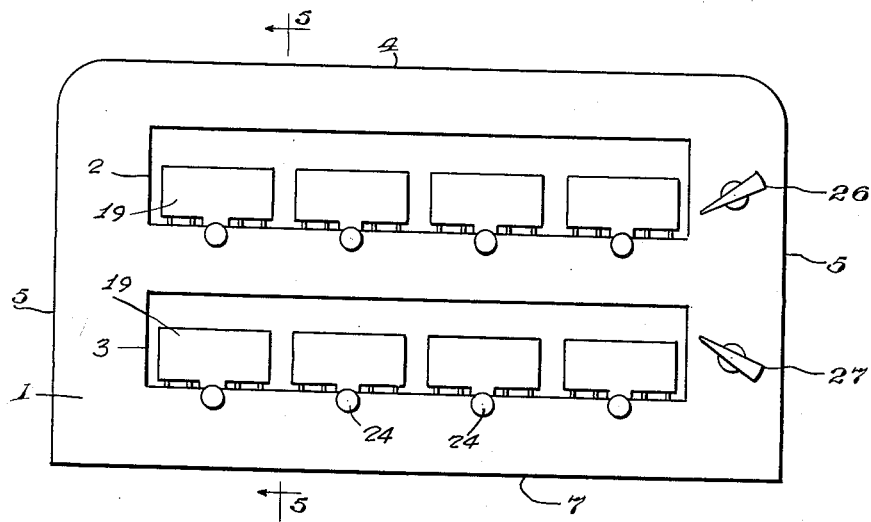
Figures 2, 3:
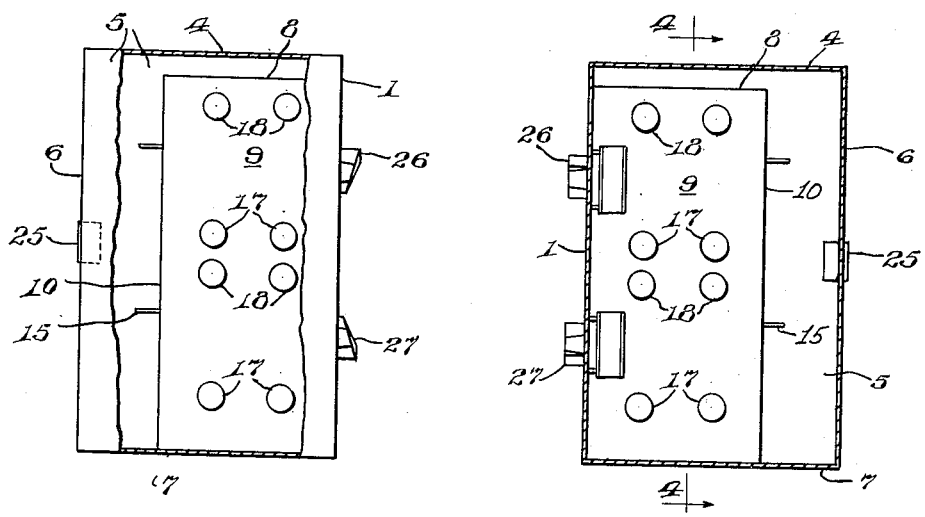
Figure 4:
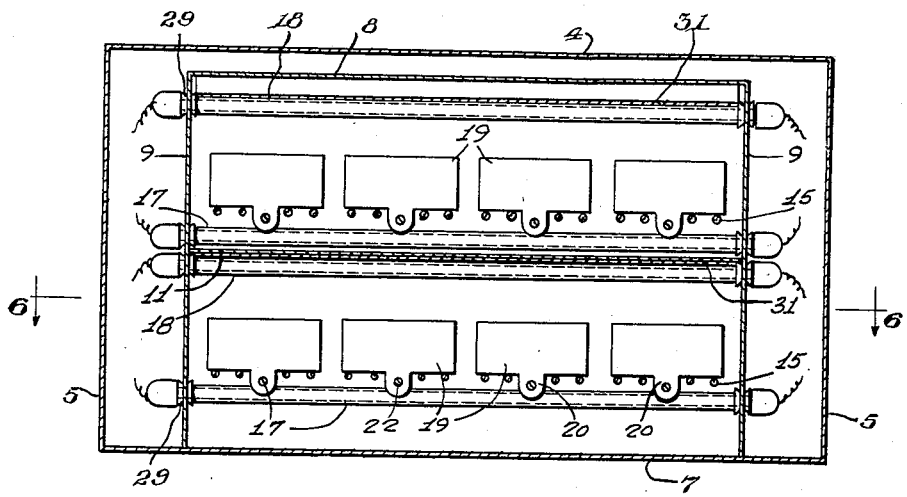
Figure 6:
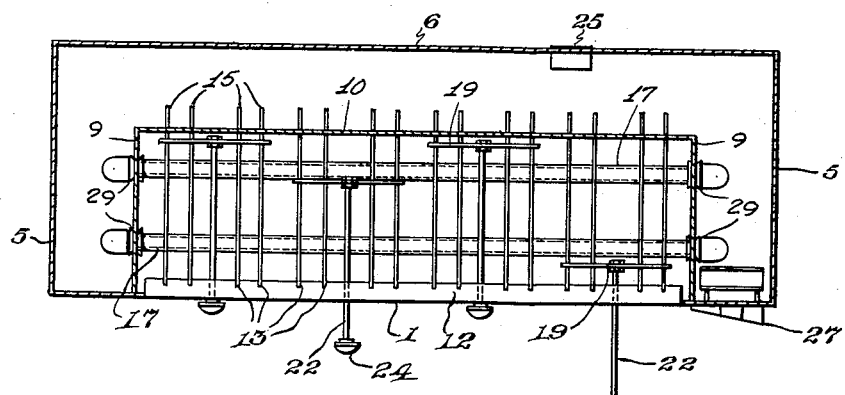
Figure 8:
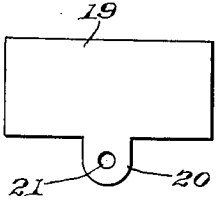

With the objects thus briefly stated, the invention comprises further details of construction and operation, which are hereinafter fully described in the following specification, when read in conjunction with the accompanying drawings, in which Fig. 1 is a front elevation of a toaster comprising one embodiment of the invention; Fig. 2 is a left end elevation of the same with a portion of the wall of the outer casing removed; Fig. 3 is a similar view of the right end of said toaster with the adjacent outer wall completely removed; Fig. 4 is a vertical longitudinal section on the line 4—4 of Fig. 5; Fig. 5 is a vertical transverse section on the line 5—5 of Fig. 1; Fig. 6 is a horizonal longitudinal section on the line 6—6 of Fig. 4; Fig. 7 is a longitudinal section on the line 7—7 of Fig. 5; Fig. 8 is an enlarged elevation of one of the ejection, impelling or shifting elements per se; Fig. 9 is an enlarged fragmentary section of the lower portion of Fig. 5; and Fig. 10 is an enlarged fragmentary side elevation of the end portion of one of the infra-red ray-producing tubes and the adjacent portion of the partition wall that operatively supports the same.

Referring to the drawings, the representative embodiment of the invention here shown comprises a front wall 1, having a pair of vertically spaced, horizontally elongated apertures 2 and 3, a top wall 4, and walls 5, a rear wall 6 and a bottom wall 7. Spaced from said top, rear and end walls, and closed forwardly by said front wall except for said apertures, is an inner housing that comprises a top wall 8, end walls 9 and a rear wall 10, said housing being provided with a horizontal partition 11 (Figs. 2 and 11), that subdivides the interior of said housing into substantially equal upper and lower compartments with preferably no communication between them. By this construction said compartments being wholly independent of each other for all practical purposes, so that heat (or cold) treatment of a food product may be carried on in one independently of whatever condition may obtain in the other.

Immediately below the level of the respective apertures 2 and 3, the adjacent portions of said front wall are deflected inwardly to provide horizontally extending flanges 12, provided with spaced apertures 13 through which loosely extend the depending angularly deflected forward end portions 14 of spaced rods 15, whose rear ends extend slidably through similarly spaced apertures in the rear wall 10 of said inner housing (Fig. 9). By this arrangement, when necessary to remove said rods for cleaning, repair and replacement, they are individually lifted at their forward ends until they are fully disengaged from said supporting flanges, after which they may be readily drawn forwardly and outwardly from the supporting apertures in said inner rear wall, and through said first-mentioned apertures 2 and 3. Replacement is by first inserting the rear ends of said rods in the respective rear wall apertures, until their forward ends are above said flanges, when said deflected end portions may be reinserted in the respective flange apertures 13.

Beneath and relatively close to each level of said rods are positioned a plurality of infra-red ray units 17, while above and spaced considerably above said rod levels are in each instance a plurality of similar units 18. Resting slidably upon said rods at both levels are a plurality of upwardly projecting impelling elements 19 (Fig. 8), each of which is provided with a centrally positioned depending ear 20 through which extends an aperture 21. For each such element there is provided a bar 22, whose rearmost end extends through and is tightly secured to the adjacent element ear, while the forward end portion of such bar extends slidably through an aperture 23 in the forward wall 1 of said device, and is provided with a manually engageable knob 24 or the like. Thus, after a food product of any kind has been treated by heat from said infra-red heat units while resting upon said supporting rods, it may be shifted forwardly upon said rods until it is readily accessible beyond said front wall, by merely shifting impelling element to the rear of it, after which said element is restored to its rear portion as before.

Electric current for energizing said heating units may be detachably connected to the device by means of any well known receptacle 25 carried by the rear wall 6 and projecting therethrough, while the heating units of the respective upper and lower compartments may be suitably connected to independent, variably adjustable switch means 26 for the upper and 27 for the lower. As the grouping of the several heating units in the respective upper and lower compartments may be either in series or parallel relationship, and by any well known electrical connections, their wired connections are not considered as being necessary to illustrate herein. The heat units may be directly supported with relation to the end walls 9 of said inner housing, but preferably extend through properly spaced pairs of apertures 28 in said walls, from which they are insulated by means of annular heat-insulative asbestos or similar washers 29.

In the operation of this device, one or more sandwiches or other desired form of edible units 30, preferably within their respective ray-passing plastic containers, are inserted through either or both of the upper and lower front wall apertures 2 and 3, and moved as far rearwardly as may be permitted by the respective impelling elements 19, while resting upon the adjacent rows of rods 15. If as illustrated the heating units in the upper chamber are connected to the upper control switch mechanism 26, and the corresponding units in the lower chamber are connected to the lower control switch mechanism 27, the heating and resulting treatment of the edible units in the two compartments may be set to cook, toast, or otherwise, at correspondingly different temperatures and/or different periods, so as to achieve correspondingly different degrees of heat penetration and thoroughness of the cooking or similar treatment.

Either after or even before the pre-set period of cooking or toasting has terminated, any one or more of the knobs 24 may be manually brought forward, so as to thereby shift forwardly the desired one or more of said edible bodies for manual removal through and from the adjacent front wall aperture. It is of course apparent that the broad principles here involved and represented by the drawings may be applied to various overall shapes and sizes of the toaster, wherefore the appended claims are not limited to the exact shape, size and internal arrangement herein illustrated and described. Furthermore, the efficiency of the device may be substantially increased and the time for toasting shortened, with a resulting decrease in the amount of current consumed, by placing polished aluminum, stainless steel, or equivalent reflecting elements 31 above the upper heating units 18, and also immediately below the heating units 17, if desired.

Having thus described my invention, what I claim and desire to protect by Letters Patent of the United States is:

1. A toaster, comprising a casing having an opening in its vertical front wall, a vertical partition within said casing, a rail supported by and between the front wall of said casing and said partition adjacent to the lower level of said opening, an impelling element slidably guided by said rail, shifting means projecting through an aperture in said front wall and connected to said element to eject through said opening a body resting upon said rail, and a source of infra-red heat rays within said casing operative to cook edible substances resting within said casing upon said rail forwardly of said element.

2. A toaster according to claim 1, characterized by a plurality of said rails, a plurality of said independent impelling elements, and said source of heat rays being common to said plurality of bodies supported upon said rails adjacent to said respective shifting means.

3. A toaster, comprising a casing having an aperture in its front wall, a vertical partition within said casing, said front wall adjacent to the lower level of said aperture being deflected inwardly to provide a flange, a plurality of parallel rods supported by and between said flange and said level of said aperture, said rods being independently removable from positioning apertures in said flange and said partition, a plurality of impelling elements, each of said elements having a depending ear and each of said elements resting slidably upon a plurality of said rods, shifting means connected to the respective ears of said elements and projecting through the front wall of said casing, to permit said elements to be shifted independently of one another to eject through said opening bodies resting upon said rails, and sources of infra-red heat rays within said casing above and below said aperture and common to the areas forwardly of said elements.

4. A toaster, comprising a casing having an opening in its front wall, a vertical partition within said casing, a flange comprising an integral extension of said front wall and directed substantially horizontally inwardly adjacent to the lower edge of said aperture and provided with spaced apertures, a plurality of rods having depending angular end portions detachably engaging said flange in its said apertures, and projecting loosely through spaced apertures in said partition to permit them to be readily removed independently of one another, a plurality of impelling elements, each of said elements resting slidably upon a plurality of said rods and having a depending ear, shifting means connected to the respective ears and projecting slidably through said front wall, to permit said elements to be shifted independently of one another to eject through said opening a body resting upon said rods, and a source of infra-red heat within said casing and common to the areas forwardly of said elements.

5. A toaster according to claim 4, in combination with variable control means to discontinue the generation of heat following a predetermined period.

6. A toaster, comprising a casing having an opening in its front wall, a vertical partition within said casing, a flange comprsing an integral extension of said front wall and directed substantially horizontally inwardly adjacent to the lower edge of said opening and provided with spaced apertures, a plurality of rods having depending angular end portions detachably engaging said flange in said apertures, and projecting loosely through spaced apertures in said partition, to permit them to be readily removed independently of one another, a plurality of impelling elements, each of said elements resting slidably upon a plurality of said rods and having a depending ear, shifting means connected to the respective ears and projecting slidably through said front wall, to permit said elements to be shifted independently of one another to eject through said opening a body resting upon said rods, and a source of infra-red heat within said casing and common to the areas forward of said elements.

References Cited in the file of this patent

UNITED STATES PATENTS

| | | |
|---|---|---|
| 1,647,013 | Partridge | Oct. 25, 1927 |
| 1,838,552 | Huenefeld | Dec. 29, 1931 |
| 1,878,258 | Bemis | Sept. 20, 1932 |
| 1,937,562 | Ginder | Dec. 5, 1933 |
| 2,595,283 | Mueller | May 6, 1952 |
| 2,614,483 | Scofield | Oct. 21, 1952 |
| 2,719,479 | Rodwick | Oct. 4, 1955 |
| 2,804,818 | March | Sept. 3, 1957 |

Notice of Adverse Decision in Interference

In Interference No. 91,412 involving Patent No. 2,927,523, P. G. Pritz, Electric toasters, final judgment adverse to the patentee was rendered April 12, 1961, as to claims 1, 2, 3, 4, 5, and 6.

[*Official Gazette June 6, 1961.*]